United States Patent
Hashimoto

(10) Patent No.: US 9,845,027 B2
(45) Date of Patent: Dec. 19, 2017

(54) VEHICLE OCCUPANT PROTECTION DEVICE

(75) Inventor: Syuzo Hashimoto, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 2439 days.

(21) Appl. No.: 12/673,179

(22) PCT Filed: Aug. 11, 2008

(86) PCT No.: PCT/JP2008/064426
§ 371 (c)(1),
(2), (4) Date: Feb. 12, 2010

(87) PCT Pub. No.: WO2009/022685
PCT Pub. Date: Feb. 19, 2009

(65) Prior Publication Data
US 2011/0098893 A1 Apr. 28, 2011

(30) Foreign Application Priority Data
Aug. 13, 2007 (JP) ................................. 2007-210963

(51) Int. Cl.
*B60R 21/0134* (2006.01)
*B60N 2/427* (2006.01)
(Continued)

(52) U.S. Cl.
CPC ....... *B60N 2/42745* (2013.01); *B60N 2/0276* (2013.01); *B60R 21/0134* (2013.01); *B60R 2021/01272* (2013.01)

(58) Field of Classification Search
USPC ........ 701/36, 45–47, 49; 180/232, 268, 271, 180/282, 286; 280/801.1, 806–807;
(Continued)

(56) References Cited

U.S. PATENT DOCUMENTS 4,659,108 A 4/1987 Sack et al.
5,071,160 A * 12/1991 White et al. .................. 280/735
(Continued)

FOREIGN PATENT DOCUMENTS

DE 36 28 657 4/1987
DE 37 27 929 1/1989
(Continued)

OTHER PUBLICATIONS

Office Action from the German Patent Office for German Appl. No. 11 2008 002 192.9 dated Sep. 15, 2011.
(Continued)

*Primary Examiner* — Thomas G Black
*Assistant Examiner* — Ce Li
(74) *Attorney, Agent, or Firm* — Finnegan, Henderson, Farabow, Garrett & Dunner, LLP

(57) ABSTRACT

A vehicle occupant protection device that smoothly operates a seat and a seatbelt. When a collision is predicted, if the time to the collision reaches a preset time t1, a seat control ECU starts operation of a seat actuator, and if a time to the collision reaches a preset time t2 (t1>t2), the seat control ECU starts operation of a seatbelt actuator. Further, when the time t2 to the collision is reached or when the time t3 (t1>t2>t3) is reached at which time the seatbelt actuator is activated to start application of a predetermined tensile force to the seatbelt, the seat control ECU stops operation of the seatbelt actuator. Seat adjustment and seatbelt adjustment may be adapted such that both the adjustments are not performed at the same time or, alternatively, such that both the adjustments are operated at the same time only during a time period in which application of the predetermined tensile force to the seatbelt starts.

12 Claims, 11 Drawing Sheets

(51) Int. Cl.
*B60N 2/02* (2006.01)
*B60R 21/01* (2006.01)

(58) Field of Classification Search
USPC .......................... 297/216.1, 216.13–216.16
See application file for complete search history.

(56) References Cited

U.S. PATENT DOCUMENTS

| | | | | |
|---|---|---|---|---|
| 5,552,986 | A | * | 9/1996 | Omura et al. .................. 701/45 |
| 5,983,148 | A | * | 11/1999 | Bigi et al. ...................... 701/45 |
| 6,082,764 | A | * | 7/2000 | Seki et al. ..................... 280/735 |
| 6,169,947 | B1 | * | 1/2001 | Fukui et al. .................... 701/45 |
| 6,336,664 | B1 | * | 1/2002 | Roder .......................... 280/806 |
| 6,421,591 | B1 | * | 7/2002 | Hackenberg .................... 701/45 |
| 6,626,463 | B1 | * | 9/2003 | Arima et al. ................... 280/806 |
| 6,629,575 | B2 | * | 10/2003 | Nikolov ........................ 180/282 |
| 6,666,292 | B2 | * | 12/2003 | Takagi et al. .................. 180/274 |
| 6,746,049 | B2 | * | 6/2004 | Pavlov et al. .................. 280/803 |
| 7,051,830 | B2 | * | 5/2006 | Enomoto ....................... 180/274 |
| 7,278,682 | B2 | * | 10/2007 | Friedman et al. ............. 297/216.1 |
| 7,604,081 | B2 | * | 10/2009 | Ootani et al. ................. 180/282 |
| 7,720,585 | B2 | * | 5/2010 | Fukuda et al. .................. 701/45 |
| 2001/0040065 | A1 | * | 11/2001 | Takagi et al. .................. 180/274 |
| 2004/0017073 | A1 | * | 1/2004 | Pavlov et al. .................. 280/806 |
| 2005/0071053 | A1 | * | 3/2005 | Yamada et al. ..................... 701/1 |
| 2006/0001298 | A1 | * | 1/2006 | Tsuruta et al. ............. 297/216.16 |
| 2006/0031015 | A1 | * | 2/2006 | Paradie ........................ 701/301 |
| 2006/0195231 | A1 | * | 8/2006 | Diebold et al. .................... 701/1 |
| 2006/0220426 | A1 | * | 10/2006 | Moffatt et al. ............. 297/216.19 |
| 2007/0107969 | A1 | * | 5/2007 | Ootani et al. ................. 180/282 |
| 2007/0185635 | A1 | | 8/2007 | Mattes et al. |
| 2007/0294013 | A1 | * | 12/2007 | Rieth et al. ..................... 701/45 |
| 2008/0012282 | A1 | * | 1/2008 | Odate et al. .................. 280/806 |
| 2008/0029633 | A1 | * | 2/2008 | Hiramatsu .................. 242/379.1 |
| 2008/0246318 | A1 | * | 10/2008 | Bothe et al. ................. 297/217.3 |

FOREIGN PATENT DOCUMENTS

| | | |
|---|---|---|
| DE | 103 33 870 | 2/2004 |
| DE | 103 10 069 | 9/2004 |
| DE | 10 2004 013 598 | 10/2005 |
| DE | 10 2005 041 389 | 9/2006 |
| JP | 2946995 | 7/1999 |
| JP | 2001-322532 | 11/2001 |
| JP | 3541676 | 4/2004 |
| JP | 2005-178443 | 7/2005 |
| JP | 2005-335616 | 12/2005 |
| JP | 2006-8026 | 1/2006 |
| JP | 2007-500650 | 1/2007 |
| JP | 2007-153306 | 6/2007 |
| RU | 2 270 778 | 2/2006 |
| WO | WO 2007/042129 | 4/2007 |

OTHER PUBLICATIONS

"Notice of Reasons for Rejection" in Japanese Application No. 2007-210963, filed Aug. 13, 2007 (dated Nov. 18, 2008).

Decision on Grant Patent for Invention for Russian Appl. No. 2010109407 dated Feb. 4, 2011.

* cited by examiner

VEHICLE OCCUPANT PROTECTION DEVICE

TECHNICAL FIELD

The present invention relates to a vehicle occupant protection device and, in particular, relates to a vehicle occupant protection device that predicts a collision and protects a vehicle occupant.

BACKGROUND ART

Various technologies have been proposed as a vehicle occupant protection device for protecting an occupant of a vehicle from a collision.

For example, in the technology disclosed in Japanese National Phase Publication No. 2007-500650, it is proposed to predict an accident, in which there is a possibility that a vehicle will become involved, by a sensor such as a radar sensor, a video sensor, a laser scanner-based sensor or the like, and in a case where an accident has been predicted, adjust a seat back at a speed that is faster than an adjustment speed at a time of adjusting an angle of the seat back.

Further, in the technology disclosed in Japanese Patent No. 2946995, it is proposed to predict a collision of a vehicle and operate a first pretensioner mechanism, and to judge the collision and operate a second pretensioner mechanism.

As discussed above, various technologies have been proposed for a vehicle occupant protection device, and protecting a vehicle occupant with even greater certainty by combining these technologies can also be considered. For example, in a case where a collision has been predicted, adjusting an angle of a seat back together with operating a pretensioner mechanism to apply tension to a seatbelt can be considered.

However, although the seat back can be moved to an appropriate state before the collision by predicting the collision and adjusting the seat back, if, at the time of this operation, tension is applied to the seatbelt by the pretensioner mechanism being operated, and the movement of the seat back and the application of tension to the seatbelt continue to be carried out simultaneously, the load of a motor that drives the seat back or the like may increase to cause the motor to break down, or excessive load may be applied to the vehicle occupant, and thus, there is room for improvement.

DISCLOSURE OF THE INVENTION

A first aspect of the invention is to provide a vehicle occupant protection device comprising: a seat adjustment section that adjusts a state of a seat to a predetermined appropriate state; a belt adjustment section that adjusts a tension of a seatbelt; a judgment section that judges whether or not there is a need to adjust the state of the seat and the tension of the seatbelt; and a control section that controls the seat adjustment section and the belt adjustment section so as to start adjustment by the belt adjustment section after adjustment by the seat adjustment section is stopped, or so as to start adjustment by the belt adjustment section after adjustment by the seat adjustment section is started and stop adjustment by the seat adjustment section at a point when a time when a predetermined tension starts to be applied to the seatbelt due to adjustment by the belt adjustment section has been reached, in a case where it has been judged by the judgment section that there is a need to adjust the state of the seat and the tension of the seatbelt.

BEST MODE FOR IMPLEMENTING THE INVENTION

One example of exemplary embodiments of the present invention will be explained below in detail with reference to the drawings.

First Exemplary Embodiment

Figure 1:
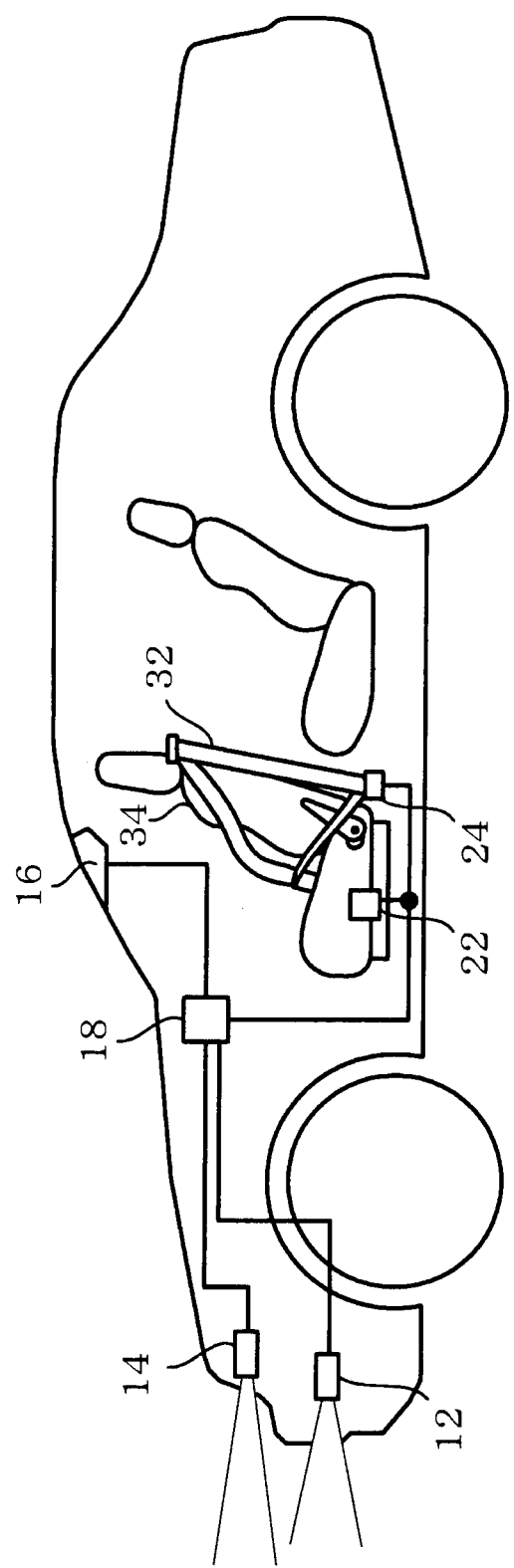
FIG. 1 is a diagram showing a vehicle arrangement position of a vehicle occupant protection device according to a first exemplary embodiment of the present invention.
Figure 2:
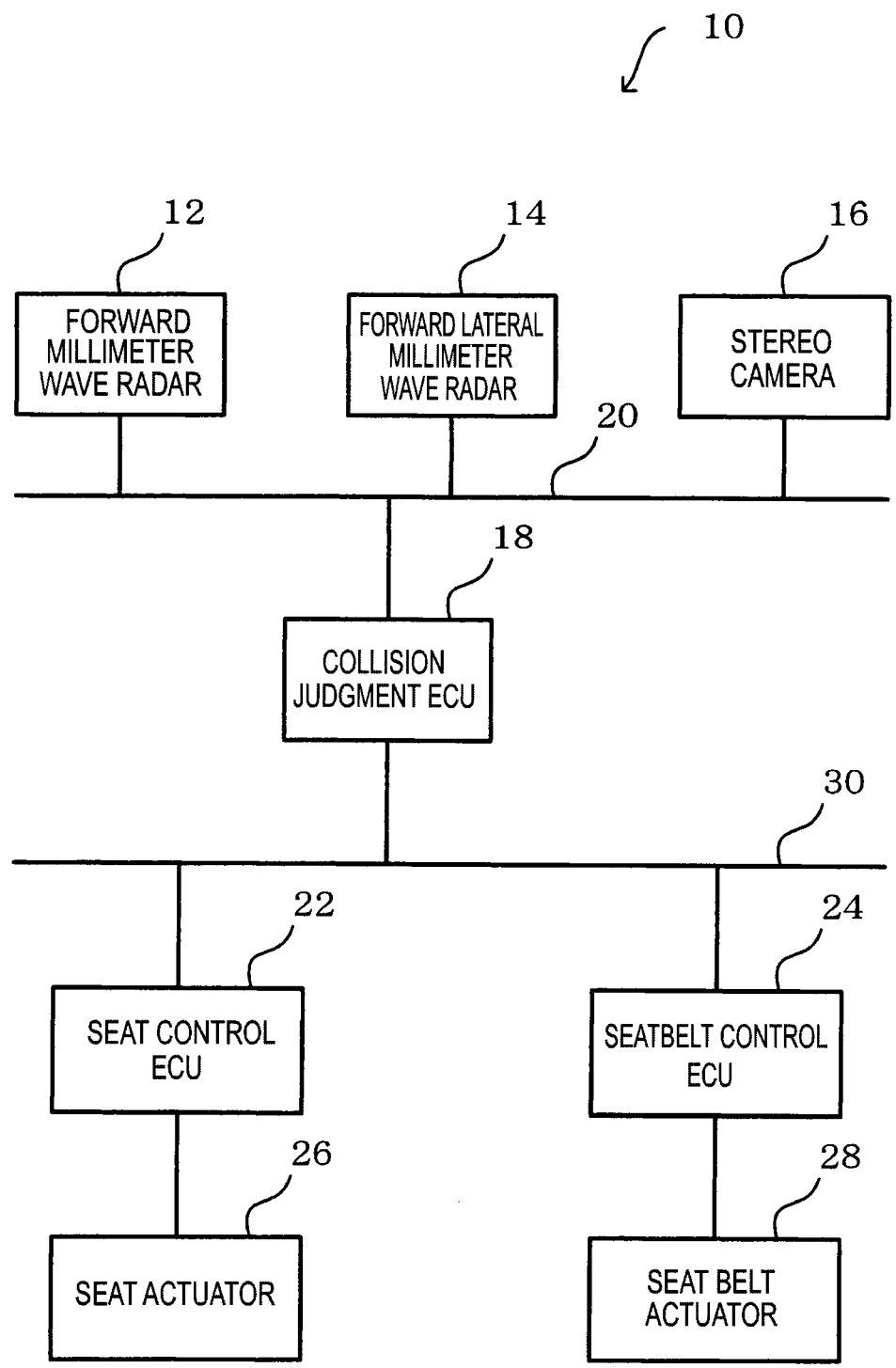
FIG. 2 is a block diagram showing a configuration of the vehicle occupant protection device according to the first exemplary embodiment of the present invention.

FIG. 1 is a diagram showing a vehicle arrangement position of a vehicle occupant protection device according to a first exemplary embodiment of the present invention, and FIG. 2 is a block diagram showing a configuration of the vehicle occupant protection device according to the first exemplary embodiment of the present invention.

As shown in FIGS. 1 and 2, the vehicle occupant protection device 10 according to the first exemplary embodiment of the present invention comprises a forward millimeter wave radar 12 for detecting a distance to a forward obstacle, a forward lateral millimeter wave radar 14 for detecting a distance to a forward lateral obstacle, a stereo camera 16 that photographs toward the front, and a collision judgment ECU (Electronic Control Unit) 18, and these are each connected to a perimeter monitoring system bus 20. The forward millimeter wave radar 12, the forward lateral millimeter wave radar 14 and the stereo camera 16 which are connected to the perimeter monitoring system bus 20 monitor a vehicle perimeter and output monitoring results to the collision judgment ECU 18.

The forward millimeter wave radar 12 is provided in the vicinity of a center of a front grill. Further, the forward lateral millimeter wave radar 14 is provided in the vicinity of both vehicle width direction ends of a bumper interior. Furthermore, the forward millimeter wave radar 12 and the forward lateral millimeter wave radar 14 are provided for respectively receiving radio waves that have reflected back from an object due to outputting millimeter waves in a vehicle forward direction and forward lateral direction, and for measuring a distance to the object, a relative speed with respect to the vehicle and the like, based on a propagation time, a frequency difference generated due to a Doppler effect or the like.

The stereo camera 16 is provided in the vicinity of a center of a top of a front windshield. The stereo camera 16 is provided for photographing in the vehicle forward direction to detect an obstacle at the perimeter and to measure a distance to the obstacle. Incidentally, it should be noted that a configuration may be provided in which the stereo camera 16 is omitted.

The collision judgment ECU 18 acquires detection results of the forward millimeter wave radar 12, the forward lateral millimeter wave radar 14 and the stereo camera 16 and carries out collision prediction. With regard to the collision prediction, various known techniques can be applied thereto, and thus, detailed explanation thereof will be omitted.

Also, the vehicle occupant protection device 10 according to the first exemplary embodiment of the present invention further comprises a seat control ECU 22 that adjusts a state of a seat 34, and a seatbelt control ECU 24 that adjusts a tension of a seatbelt 32. The seat control ECU 22 and the seatbelt control ECU 24 are each connected to a vehicle system bus 30, and the collision judgment ECU 18 is further connected to the vehicle system bus 30.

Figure 3:
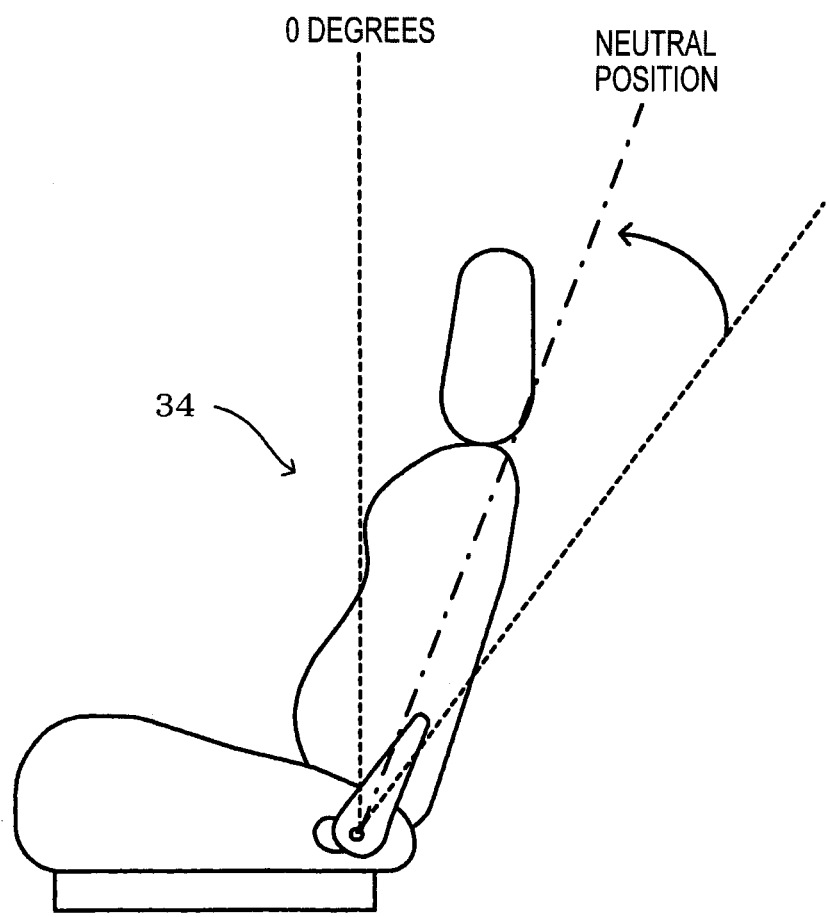
FIG. 3 is a diagram for explaining one example of an appropriate state of a seat.

A seat actuator 26 for adjusting respective states of the seat 34 is connected to the seat control ECU 22. In a case where a collision has been predicted, the collision judgment ECU 18 controls operation of the seat actuator 26 to adjust seat reclining and seat sliding and adjusts the state of the seat 34 to a predetermined appropriate state (appropriate range) before the collision. As shown in FIG. 3, in the present exemplary embodiment, an angle of a seat back, i.e., reclining, is adjusted so as to be at a predetermined neutral position.

Further, in a case where changing of the state of the seat 34 has been instructed by an unillustrated switch or the like, the seat control ECU 22 operates the seat actuator 26 to change the state of the seat 34, such as seat sliding, reclining or the like, in accordance with an operational state of the switch. Incidentally, it should be noted that, in a case where the seat actuator 26 is driven due to instruction by the switch, and in a case where the seat actuator 26 is driven when a collision has been predicted, the seat control ECU 22 drives the seat actuator 26 at different speeds. Furthermore, in the case where the seat actuator 26 is driven when a collision has been predicted, in order to immediately adjust the seat 34 to the appropriate state, the seat control ECU 22 drives the seat actuator 26 so as to adjust the state of the seat 34 at a speed that is faster than that in the case where the seat actuator 26 is driven by switch operation.

On the other hand, a seatbelt actuator 28 for carrying out a wind-up operation of the seatbelt 32 is connected to the seatbelt control ECU 24. In a case where a collision has been predicted by the collision judgment ECU 18, the seat control ECU 24 controls operation of the seatbelt actuator 28 to adjust a tension of the seatbelt 32.

Incidentally, in a case where a collision has been predicted, if adjustment of the seat 34 and adjustment of the seatbelt 32 are carried out simultaneously, a load of the seat actuator 26 for carrying out adjustment of the seat 34 increases, and a load on the vehicle occupant increases. In this regard, in the present exemplary embodiment, in a case where a collision has been predicted, operation of the seat actuator 26 is started by the seat control ECU 22 at a point when a time until the collision has become a predetermined time t1, and operation of the seatbelt actuator 28 is started by the seatbelt control ECU 24 at a point when the time until the collision has become a predetermined time t2 (t1>t2). Further, the seat control ECU 22 stops operation of the seat actuator 26 at a point when the time t2 or a time t3 (t1>t2>t3) when the seatbelt actuator 28 operates so that a predetermined tension starts to be applied to the seatbelt 32 has been reached.

Next, processing of the respective ECUs of the vehicle occupant protection device 10 according to the first exemplary embodiment of the present invention, which is configured as described above, will be explained in detail.

Figure 4:
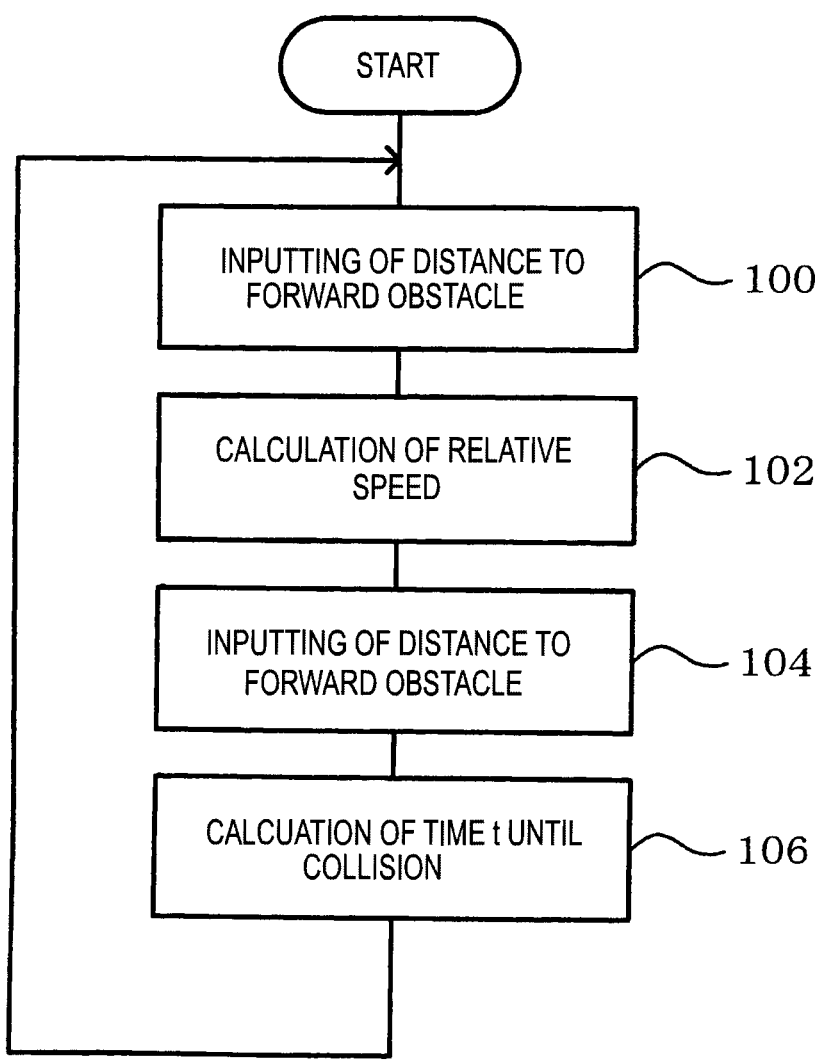
FIG. 4 is a flowchart showing one example of a flow of processing that is carried out at a collision judgment ECU of the vehicle occupant protection device according to the first exemplary embodiment of the present invention.

First, processing that is carried out at the collision judgment ECU 18 will be explained. FIG. 4 is a flowchart showing one example of a flow of processing that is carried out at the collision judgment ECU 18 of the vehicle occupant protection device 10 according to the first exemplary embodiment of the present invention. Incidentally, it should be noted that the processing in FIG. 4 will be explained as processing that starts when an ignition switch has been turned on and finishes when the ignition switch has been turned off or the vehicle has collided.

At step 100, a distance to a forward obstacle is inputted, and the flow switches to step 102. That is to say, the detection results of the forward millimeter wave radar 12, the forward lateral millimeter wave radar 14, the stereo camera 16 and the like are inputted.

At step 102, a relative speed is calculated, and the flow switches to step 104. For example, the relative speed is calculated from the distances to the forward obstacle that have been detected by the millimeter radar per a predetermined time period. Incidentally, it should be noted that a configuration may be provided in which the distance is obtained and the relative speed is calculated by subjecting the photographing results of the stereo camera 16 to image processing.

At step 104, detection results of the millimeter radar are newly inputted, and the flow switches to step 106.

At step 106, a time t until a collision is calculated, the flow returns to step 100, and the above-described processing is repeated. That is to say, the time t until the collision is calculated from the distance to the forward obstacle that has been detected by the forward millimeter wave radar 12, the forward lateral millimeter wave radar 14, the stereo camera 16 and the like, and from the relative speed that has been calculated at step 102, the flow returns to step 100, and the above-described processing is repeated.

Figure 5:
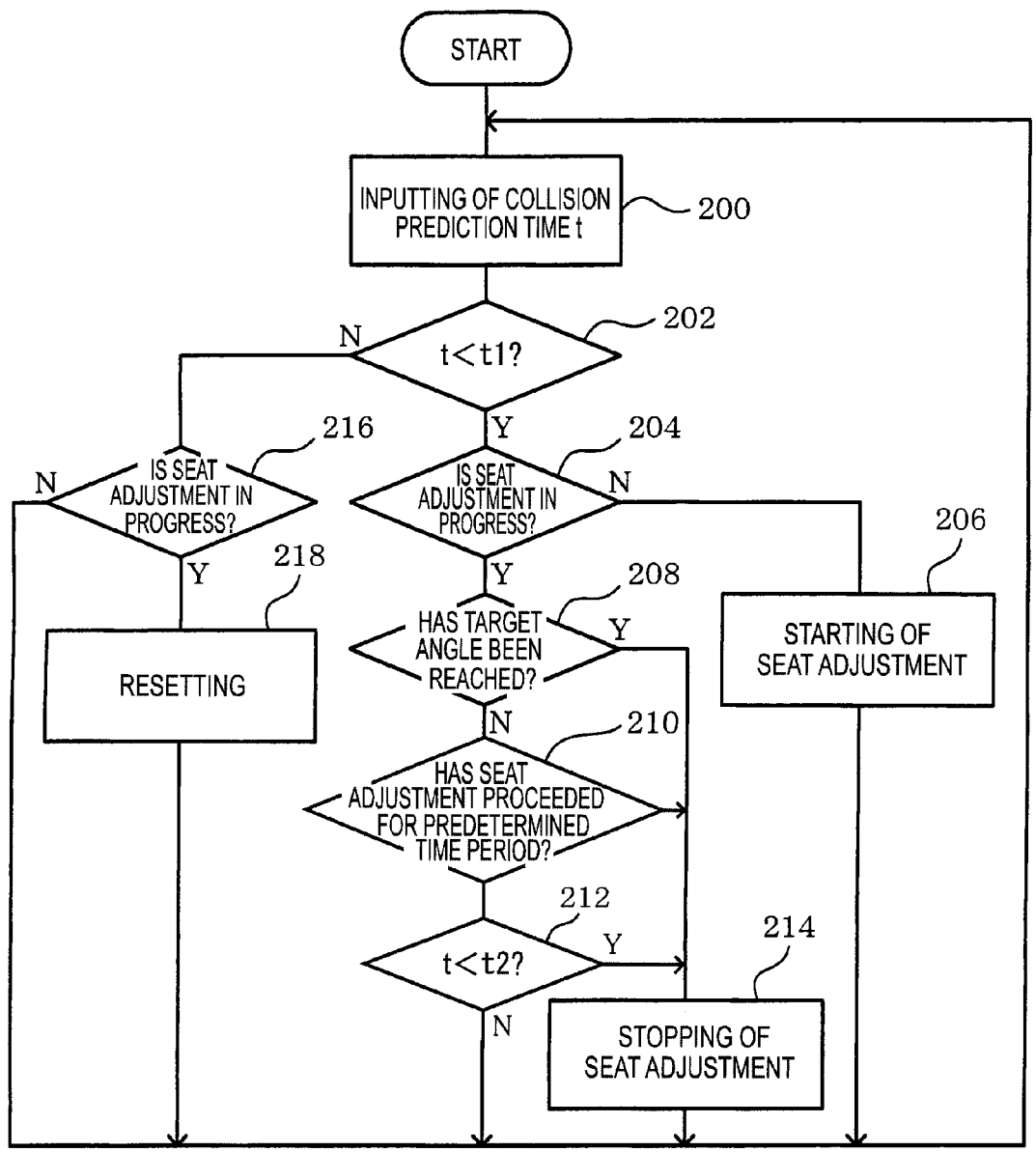
FIG. 5 is a flowchart showing one example of a flow of processing that is carried out at a seat control ECU of the vehicle occupant protection device according to the first exemplary embodiment of the present invention.

Next, processing that is carried out at the seat control ECU 22 will be explained. FIG. 5 is a flowchart showing one example of a flow of processing that is carried out at the seat control ECU 22 of the vehicle occupant protection device 10 according to the first exemplary embodiment of the present invention. Incidentally, it should be noted that the processing in FIG. 5 will be explained as processing that starts when the ignition switch has been turned on and finishes when the ignition switch has been turned off or the vehicle has collided.

At step 200, the collision prediction time t that has been calculated by the collision judgment ECU 18 is inputted, and the flow switches to step 202.

At step 202, it is determined whether or not the collision prediction time t has become less than the predetermined time t1. In a case where the determination is affirmative, the flow switches to step 204, and in a case where the determination is negative, the flow switches to step 216.

At step 204, it is determined whether or not seat adjustment is in progress. In this determination, it is determined whether or not the time less than the collision time t1 has already been reached and the seat actuator 26 is operating. In a case where the determination is negative, the flow switches to step 206, and in a case where the determination is affirmative, the flow switches to step 208.

At step 206, seat adjustment is started due to operation of the seat actuator 26 being started, and the flow returns to step 200. That is to say, an angle of the seat back is adjusted to a predetermined angle (angle range).

Further, at step 208, it is determined whether or not a target angle, that is, the predetermined angle of the seat back, has been reached. In a case where the determination is negative, the flow switches to step 210, and in a case where the determination is affirmative, the flow switches to step 214. Incidentally, it should be noted that, for the determination of whether or not the target angle has been reached, determination may be carried out from a driving amount of the seat actuator 26, a configuration may be provided in which a sensor that detects a reclining angle is provided to carry out detection according to a detection value of the sensor, or a configuration may be provided in which a limit switch is provided at a predetermined appropriate angle, and it is determined whether or not the switch has been turned on.

At step 210, it is determined whether or not seat adjustment has proceeded for a predetermined time period. In this determination, a predetermined time period for preventing the seat adjustment from being continued after a collision is set, and it is determined whether or not the predetermined time period has elapsed. In a case where the determination is affirmative, the flow switches to step 214, and in a case where the determination is negative, the flow switches to step 212.

At step 212, it is determined whether or not the collision prediction time t has become less than the predetermined time t2. In a case where the determination is affirmative, the flow switches to step 214, and in a case where the determination is negative, the flow returns to step 200, and the above-described processing is repeated. Incidentally, it should be noted that, at step 212, a configuration may be provided in which it is determined whether or not the time t3 when the seatbelt actuator 28 operates so that the predetermined tension starts to be applied to the seatbelt 32 has been reached (FIG. 7(B)).

At step 214, seat adjustment is stopped, the flow returns to step 200, and the above-described processing is repeated.

On the other hand, when the determination of step 202 is negative and the flow switches to step 216, it is determined whether or not seat adjustment is in progress. That is to say, it is determined whether or not the seat actuator 26 is already operating. In a case where the determination is affirmative, the flow switches to step 218, and in a case where the determination is negative, the flow returns to step 200, and the above-described processing is repeated.

At step 218, since seat adjustment is being carried out due to operation of the seat actuator 26, resetting is carried out to stop operation of the seat actuator 26, the flow returns to step 200, and the above-described processing is repeated. Incidentally, it should be noted that a configuration may be provided in which, as the resetting, the seat actuator 26 operates to return to the state before the operation of the seat actuator 26.

Figure 6:
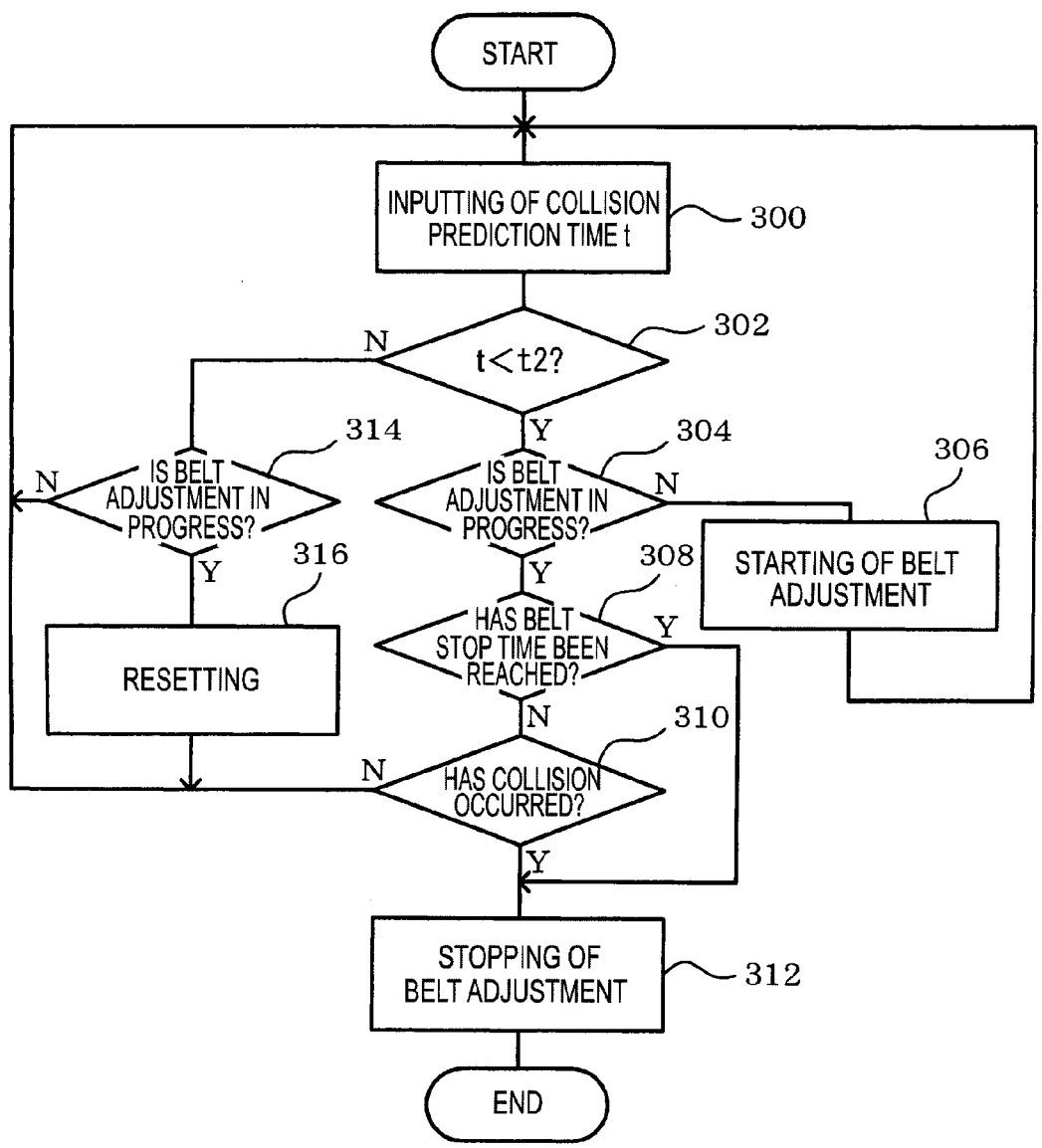
FIG. 6 is a flowchart showing one example of a flow of processing that is carried out at a seatbelt control ECU of the vehicle occupant protection device according to the first exemplary embodiment of the present invention.

Next, a flow of processing that is carried out at the seatbelt control ECU 24 will be explained. FIG. 6 is a flowchart showing one example of the flow of processing that is carried out at the seatbelt control ECU 24 of the vehicle occupant protection device 10 according to the first exemplary embodiment of the present invention. Incidentally, it should be noted that the processing in FIG. 6 will be explained as processing that starts when the ignition switch has been turned on.

At step 300, the collision prediction time t that has been calculated by the collision judgment ECU 18 is inputted, and the flow switches to step 302.

At step 302, it is determined whether or not the collision prediction time t has become less than the predetermined time t2. In a case where the determination is affirmative, the flow switches to step 304, and in a case where the determination is negative, the flow switches to step 314.

At step 304, it is determined whether or not seatbelt adjustment is in progress. In this determination, it is determined whether or not the time less than the collision time t2 has already been reached and the seatbelt actuator 28 is operating. In a case where the determination is negative, the flow switches to step 306, and in a case where the determination is affirmative, the flow switches to step 308.

At step 306, seatbelt adjustment is started due to operation of the seatbelt actuator 28 being started, and the flow returns to step 300. That is to say, tension is applied to the seatbelt 32.

Further, at step 308, it is determined whether or not a predetermined belt stop time (a time from starting of belt adjustment until a desired tension is reached) has been reached. In a case where the determination is negative, the flow switches to step 310, and in a case where the determination is affirmative, the flow switches to step 312.

At step 310, it is determined whether or not the collision has occurred. In this determination, it is determined whether or not the collision prediction time has been reached, or it is determined whether or not the collision has been detected by a collision sensor such as an unillustrated bumper sensor, acceleration sensor or the like. In a case where the determination is affirmative, the flow switches to step 312, and in a case where the determination is negative, the flow returns to step 300, and the above-described processing is repeated.

At step 312, operation of the seatbelt actuator 28 is stopped, belt adjustment is stopped, and the series of processing is finished.

On the other hand, when the determination of step 302 is negative and the flow switches to step 314, it is determined whether or not belt adjustment is in progress. That is to say, it is determined whether or not the seatbelt actuator 28 is already operating. In a case where the determination is affirmative, the flow switches to step 316, and in a case where the determination is negative, the flow returns to step 300, and the above-described processing is repeated.

At step 316, since seatbelt adjustment is being carried out due to operation of the seatbelt actuator 28, resetting is carried out to stop operation of the seatbelt actuator 28, the flow returns to step 300, and the above-described processing is repeated.

Figure 7A:
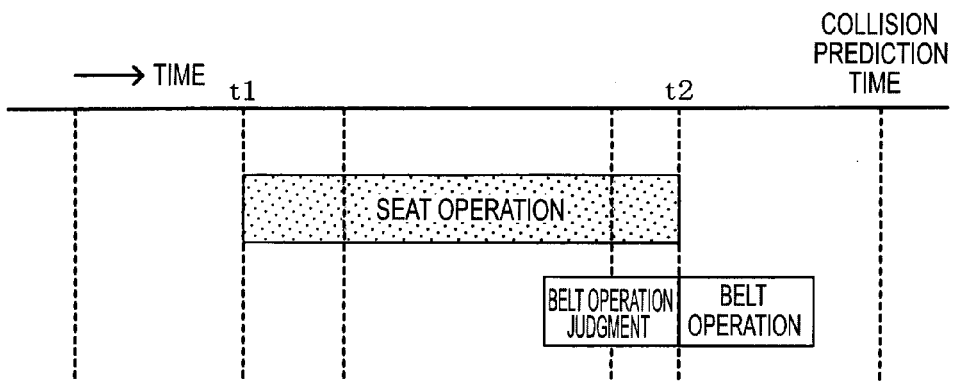
FIG. 7A is a diagram for explaining a starting timing of seat adjustment and seatbelt adjustment of the vehicle occupant protection device according to the first exemplary embodiment of the present invention.
Figure 7B:
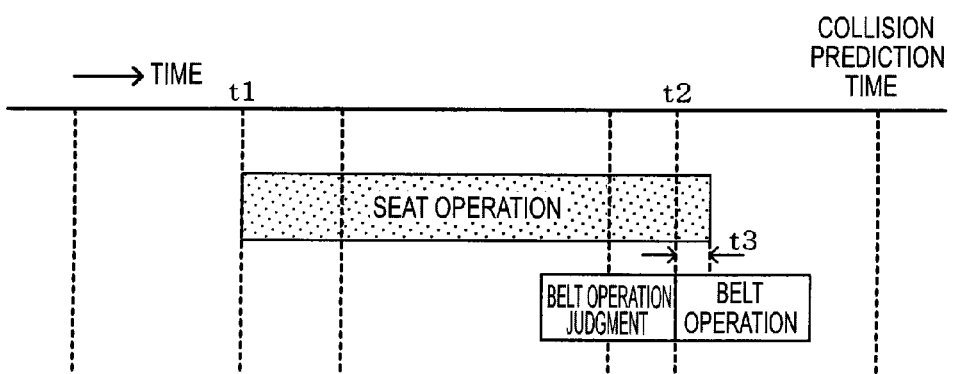
FIG. 7B is a diagram showing a case where a seat stopping timing has been changed.

That is to say, in the vehicle occupant protection device 10 according to the first exemplary embodiment of the present invention, as shown in FIGS. 7(A) and 7(B), adjustment of the seat 34 is started at the point when the collision prediction time has become t1, and adjustment of the seatbelt 32 is started at the point when the collision prediction time has become t2. Further, adjustment of the seat 34 is stopped at the point when the collision prediction time has become t2 or time t3 when the seatbelt actuator 28 operates so that the predetermined tension starts to be applied to the seatbelt 32. As a result, a situation in which adjustment of the seat 34 and adjustment of the seatbelt 32 continue to be simultaneously carried out until a break down occurs is avoided, and a situation in which the load of the seat actuator 26 for carrying out adjustment of the seat 34 increases to cause a break down, or in which an excessive load is applied to the vehicle occupant, can be prevented.

Figure 7C:
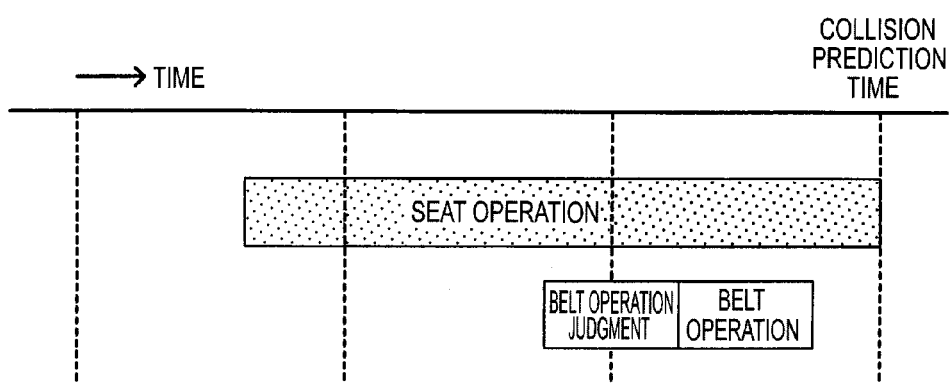
FIG. 7C is a diagram showing a case where the seatbelt adjustment is started without the seat adjustment being completed and the adjustment is carried out simultaneously.

Further, in the present exemplary embodiment, in a case where a collision has been predicted, since seat adjustment is carried out at a speed that is faster than that of seat adjustment due to operation by the vehicle occupant, a situation, as shown in FIG. 7(C), in which seatbelt adjustment is started without seat adjustment being completed and both adjustments continue to be simultaneously carried out until a break down occurs, or in which an excessive load is applied to the vehicle occupant, can be prevented.

Incidentally, it should be noted that, depending on the adjustment amount of the seat 34, since adjustment to the appropriate state finishes immediately, even if a configuration is provided in which the seat adjustment stopping determination processing (step 212) is omitted with adjustment of the seatbelt 32 just being carried out after the starting of seat adjustment, it is possible to prevent a situation in which adjustment of the seat 34 and adjustment of the seatbelt 32 continue to be simultaneously carried out and break down occurs, or in which an excessive load is applied to the vehicle occupant, in the same manner as in the above-described exemplary embodiment.

Moreover, by carrying out adjustment of the seatbelt 32 after adjusting the seat 34 to the appropriate state, the tension of the seatbelt 32 can be applied to the vehicle occupant at an appropriate riding posture, and therefore, vehicle occupant protection by the seatbelt 32 can be carried out appropriately.

Second Exemplary Embodiment

Figure 8:
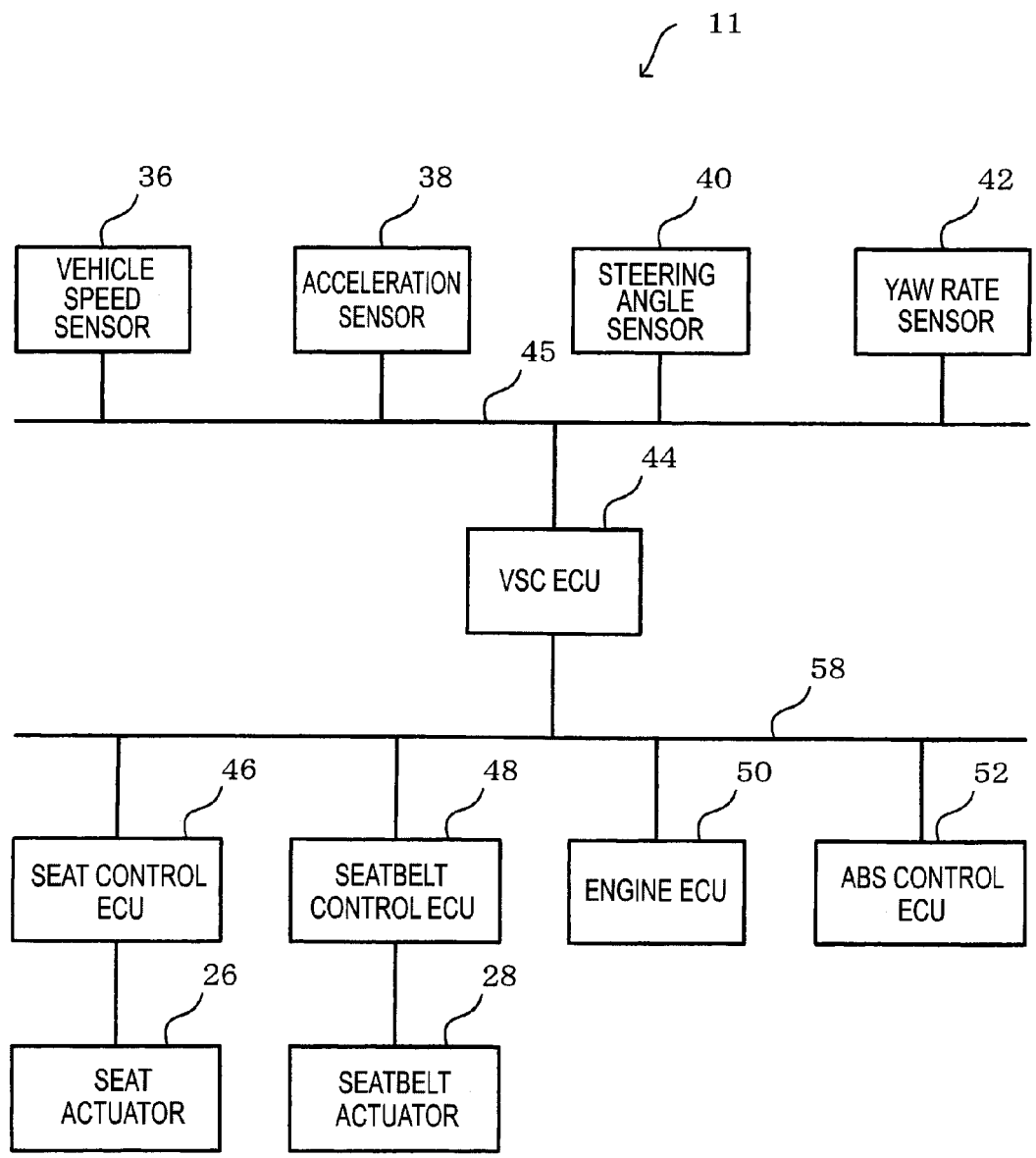
FIG. 8 is a block diagram showing a configuration of a vehicle occupant protection device according to a second exemplary embodiment of the present invention.

Next, a vehicle occupant protection device according to a second exemplary embodiment of the present invention will be explained. FIG. 8 is a block diagram showing a configuration of a vehicle occupant protection device 11 according to the second exemplary embodiment of the present invention.

In the first exemplary embodiment, a configuration was provided in which a collision is predicted and seat adjustment and seatbelt adjustment are carried out in accordance with the time until the collision, but in the present exemplary embodiment, seat adjustment and seatbelt adjustment are carried out in accordance with a degree of instability of the vehicle. Specifically, a configuration is provided in which a VSC (vehicle stability control) system is utilized, a traveling state of the vehicle is judged, and seat adjustment and seatbelt adjustment are carried out in accordance with the judgment results. In more detail, a configuration is provided in which, in a case where a state of the vehicle (degree of instability) becomes a first value (for example, a condition due to which control by the VSC system is started, such as a slipping state or the like), seat adjustment is started, and in a case where the state of the vehicle becomes a second value (for example, a value representing a drifting state or a spinning state, or the like), seatbelt adjustment is started.

As shown in FIG. 8, the vehicle occupant protection device 11 according to the second exemplary embodiment of the present invention comprises a vehicle speed sensor 36, an acceleration sensor 38, a steering angle sensor 40, a yaw rate sensor 42 and a VSC ECU 44, and these are each connected to a vehicle state detection bus 45. The detection results of the respective sensors that are connected to the vehicle state detection bus 45 are outputted to the VSC ECU 44.

The vehicle speed sensor 36 detects a traveling speed of the vehicle. The acceleration sensor 38 detects acceleration in respective directions that is applied to the vehicle. The steering angle sensor 40 detects a steering angle of the steering. Further, the yaw rate sensor 42 detects a yaw rate that is generated at the vehicle.

Also, the vehicle occupant protection device 11 according to the second exemplary embodiment of the present invention further comprises a seat control ECU 46 that adjusts a state of a seat, a seatbelt control ECU 48 that adjusts a tension of a seatbelt, an engine ECU 50 that controls an engine, and an ABS control ECU 52 that controls an ABS (anti-lock brake system). Each of these is connected to a vehicle system bus 58, and the VSC ECU 44 is connected to the vehicle system bus 58.

The engine ECU 50 controls operation of the engine in accordance with detection values of respective sensors (for example, an air temperature sensor, a throttle position sensor, a vacuum sensor, a water temperature sensor and the like) that are provided for engine control, and the ABS control ECU 52 controls operation of a brake.

That is to say, a degree of instability of the vehicle is judged by the VSC ECU 44, and by controlling the engine ECU 50, the ABS control ECU 52 and the like in accordance with the judgment results, a vehicle posture is controlled so as to become an appropriate posture. Incidentally, it should be noted that, with regard to the VSC, various known techniques can be applied thereto, and thus, detailed description thereof will be omitted. Further, in the present exemplary embodiment, although a configuration is applied in which the engine and the brake are designated as the control objects to control the vehicle posture, the invention is not limited thereto, and various techniques can be applied.

The seat actuator 26 for adjusting the state of the seat is connected to the seat control ECU 46. The seat control ECU 45 controls operation of the seat actuator 26, and adjusts seat reclining or seat sliding to adjust to a predetermined appropriate state (appropriate range), in accordance with the degree of instability of the vehicle that has been judged by the VSC ECU 44. For example, in the same manner as in the first exemplary embodiment, an angle of a seat back, that is, reclining, is adjusted so as to be at a predetermined neutral position, as shown in FIG. 3.

Further, in a case where changing of the state of the seat has been instructed by an unillustrated switch or the like, the seat control ECU 46 operates the seat actuator 26 to change the state of the seat, such as seat sliding, reclining or the like, in accordance with an operational state of the switch. Incidentally, it should be noted that, in a case where the seat actuator 26 is driven due to instruction by the switch, and in a case where the seat actuator is driven in accordance with the degree of instability of the vehicle, the seat control ECU 46 drives the seat actuator 26 at different speeds. In the case where the seat actuator 26 is driven in accordance with the degree of instability of the vehicle, in order to immediately adjust the seat to the appropriate state, the seat control ECU 46 drives the seat actuator 26 so as to adjust the state of the seat at a speed that is faster than that in the case where the seat actuator 26 is driven by switch operation.

The seatbelt actuator 28 for carrying out a wind-up operation of the seatbelt 32 is connected to the seatbelt control ECU 48, and in a case where the degree of instability of the vehicle according to the VSC ECU 44 becomes a predetermined value, the seatbelt control ECU 48 controls operation of the seatbelt actuator 28 to adjust the tension of the seatbelt 32.

In the present exemplary embodiment as well, if adjustment of the seat and adjustment of the seatbelt are carried out simultaneously, a load of the seat actuator 26 for carrying out adjustment of the seat increases, and a load on the vehicle occupant increases, in a similar manner as in the first exemplary embodiment. In this regard, in the present exemplary embodiment, the degree of instability of the vehicle is judged, operation of the seat actuator 26 is started by the seat control ECU 46 at a point when the degree of instability has become a first value, and operation of the seatbelt actuator 28 is started by the seatbelt control ECU 48 at a point when the degree of instability of the vehicle has become a second value (a value at which the degree of instability of the vehicle is larger than at the first value). Further, the seat control ECU 46 stops operation of the seat actuator 26 at a point when the degree of instability of the vehicle has become the second value or at a point when the time t3 when the seatbelt actuator 28 operates so that the predetermined tension starts to be applied to the seatbelt 32 has been reached.

Next, processing of the respective ECUs of the vehicle occupant protection device 11 according to the second exemplary embodiment of the present invention, which is configured as described above, will be explained in detail.

Figure 9:
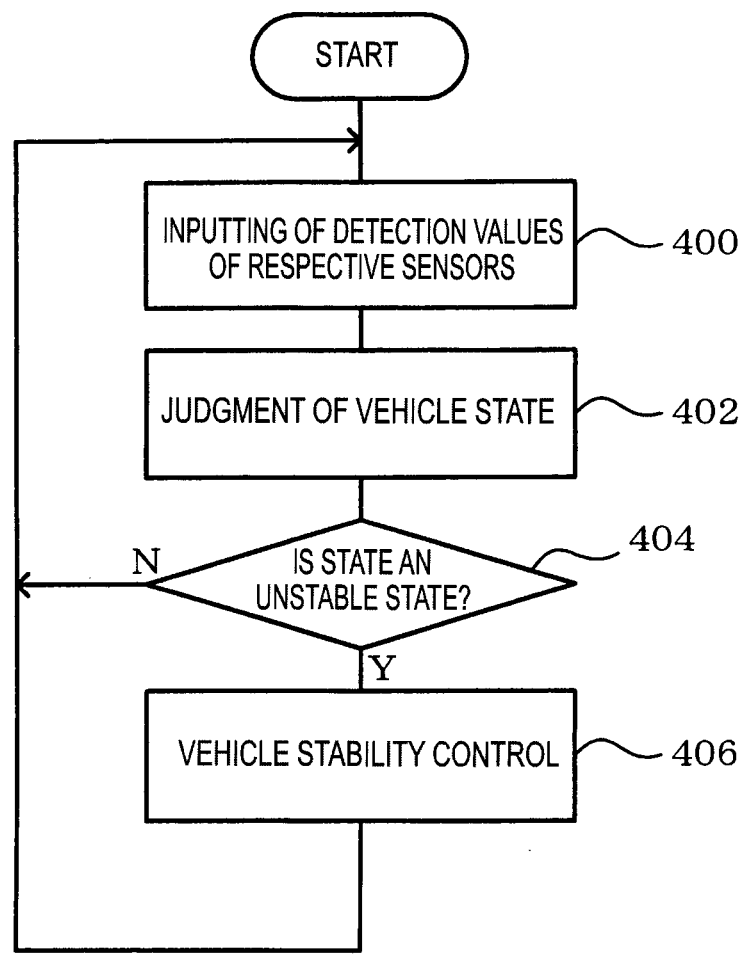
FIG. 9 is a flowchart showing one example of a flow of processing that is carried out at a VSC ECU of the vehicle occupant protection device according to the second exemplary embodiment of the present invention.

First, processing that is carried out at the VSC ECU 44 will be explained. FIG. 9 is a flowchart showing one example of a flow of processing that is carried out at the VSC ECU 44 of the vehicle occupant protection device 11 according to the second exemplary embodiment of the present invention. Incidentally, it should be noted that the processing in FIG. 9 will be explained as processing that starts when an ignition switch has been turned on and finishes when the ignition switch has been turned off.

At step 400, detection values of the respective sensors (the vehicle speed sensor 36, the acceleration sensor 38, the steering angle sensor 40, the yaw rate sensor 42 and the like) are inputted, and the flow switches to step 402.

At step 402, the vehicle state is judged based on the detection values of the respective sensors, and the flow switches to step 404. As the judgment of the vehicle state, various known techniques can be applied, and for example, a state (degree of instability) of the vehicle such as a slipping state, a drifting state, a spinning state or like is judged.

At step 404, it is determined whether or not the judged state of the vehicle is an unstable state. In a case where the determination is affirmative, the flow switches to step 406, and in a case where the determination is negative, the flow returns to step 400 and the above-described processing is repeated.

At step 406, vehicle stability control is carried out, the flow returns to step 400, and the above-described processing is repeated. That is to say, the engine ECU 50, the ABS control ECU 52 and the like are controlled to carry out control so that the vehicle posture stabilizes.

Figure 10:
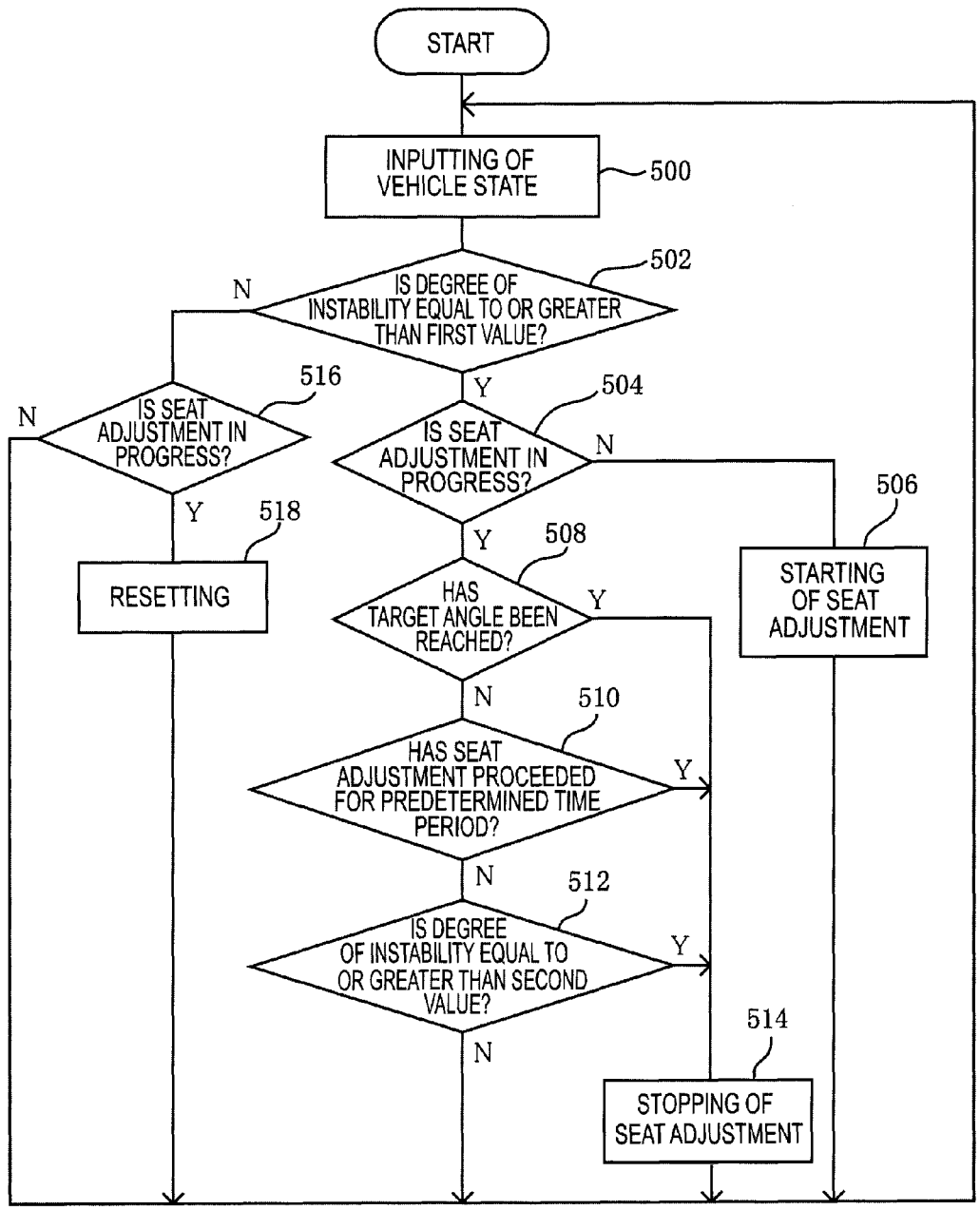
FIG. 10 is a flowchart showing one example of a flow of processing that is carried out at a seat control ECU of the vehicle occupant protection device according to the second exemplary embodiment of the present invention.

Next, processing that is carried out at the seat control ECU 46 will be explained. FIG. 10 is a flowchart showing one example of a flow of processing that is carried out at the seat control ECU 46 of the vehicle occupant protection device 11 according to the second exemplary embodiment of the present invention. Incidentally, it should be noted that the processing in FIG. 10 will be explained as processing that starts when the ignition switch has been turned on and finishes when the ignition switch has been turned off.

At step 500, the vehicle state that has been judged by the VSC ECU 44 is inputted, and the flow switches to step 502.

At step 502, it is determined whether or not the degree of instability of the vehicle is equal to or greater than the first value. In this determination, it is determined, for example, whether or not a slipping state or a drifting state has occurred, as the first value. In a case where the determination is affirmative, the flow switches to step 504, and in a case where the determination is negative, the flow switches to step 516.

At step 504, it is determined whether or not seat adjustment is in progress. In this determination, it is determined whether or not the degree of instability of the vehicle has already become equal to or greater than the first value and the seat actuator 26 is operating. In a case where the determination is negative, the flow switches to step 506, and in a case where the determination is affirmative, the flow switches to step 508.

At step 506, seat adjustment is started due to operation of the seat actuator 26 being started, and the flow returns to step 500. That is to say, an angle of the seat back is adjusted to a predetermined angle (angle range).

Further, at step 508, it is determined whether or not a target angle, that is, the predetermined angle of the seat back, has been reached. In a case where the determination is negative, the flow switches to step 510, and in a case where the determination is affirmative, the flow switches to step 514. Incidentally, it should be noted that, for the determination of whether or not the target angle has been reached, determination may be carried out from a driving amount of the seat actuator 26, a configuration may be provided in which a sensor that detects a reclining angle is provided to carry out detection according to a detection value of the sensor, or a configuration may be provided in which a limit switch is provided at a predetermined appropriate angle, and it is determined whether or not the switch has been turned on.

At step 510, it is determined whether or not seat adjustment has proceeded for a predetermined time period. In this determination, a predetermined time period for preventing the seat adjustment from being continued after the vehicle becomes unstable and a collision occurs is set, and it is determined whether or not the predetermined time period has elapsed. In a case where the determination is affirmative, the flow switches to step 514, and in a case where the determination is negative, the flow switches to step 512.

At step 512, it is determined whether or not the degree of instability of the vehicle has become equal to or greater than the second value. In this determination, it is determined, for example, whether or not the slipping state or drifting state has switched to a spinning state or the like, as the second value. In a case where the determination is affirmative, the flow switches to step 514, and in a case where the determination is negative, the flow returns to step 500, and the above-described processing is repeated. Incidentally, it should be noted that, at step 512, a configuration may be provided in which it is determined whether or not the time t3 when the seatbelt actuator 28 operates so that the predetermined tension starts to be applied to the seatbelt 32 has been reached.

At step 514, seat adjustment is stopped, the flow returns to step 500, and the above-described processing is repeated.

On the other hand, when the determination of step 502 is negative and the flow switches to step 516, it is determined whether or not seat adjustment is in progress. That is to say, it is determined whether or not the degree of instability of the vehicle has already become equal to or greater than the first value and the seat actuator 26 is operating. In a case where the determination is affirmative, the flow switches to step 518, and in a case where the determination is negative, the flow returns to step 500, and the above-described processing is repeated.

At step 518, since seat adjustment is being carried out due to operation of the seat actuator 26, resetting is carried out to stop operation of the seat actuator 26, the flow returns to step 500, and the above-described processing is repeated. Incidentally, it should be noted that a configuration may be provided in which, as the resetting, the seat actuator 26 operates to return to the state before the operation of the seat actuator 26.

Figure 11:
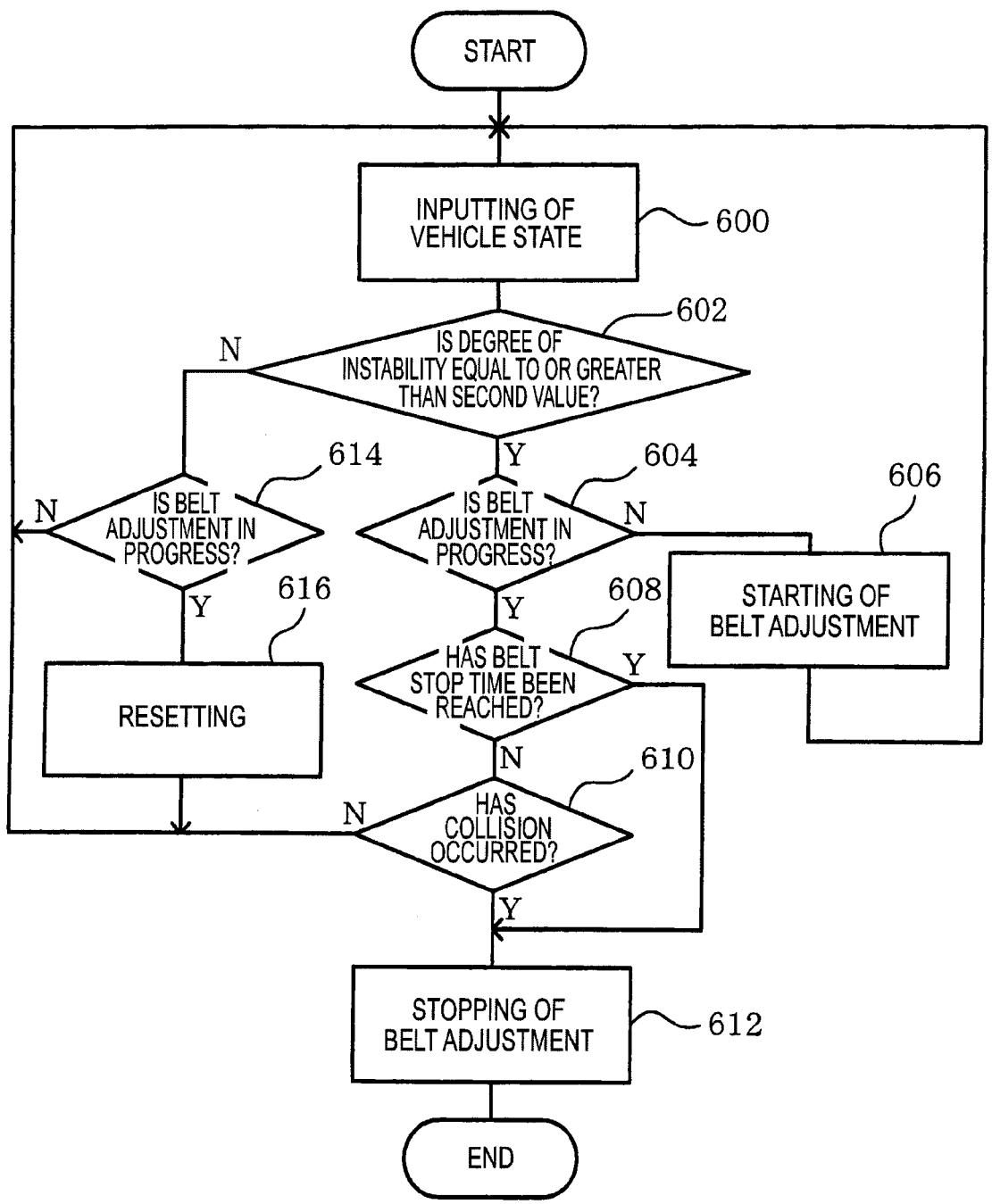
FIG. 11 is a flowchart showing one example of a flow of processing that is carried out at a seatbelt control ECU of the vehicle occupant protection device according to the second exemplary embodiment of the present invention.

Next, a flow of processing that is carried out at the seatbelt control ECU 48 will be explained. FIG. 11 is a flowchart showing one example of the flow of processing that is carried out at the seatbelt control ECU 48 of the vehicle occupant protection device 11 according to the second exemplary embodiment of the present invention. Incidentally, it should be noted that the processing in FIG. 11 will be explained as processing that starts when the ignition switch has been turned on.

At step 600, the vehicle state that has been judged by the VSC ECU 44 is inputted, and the flow switches to step 602.

At step 602, it is determined whether or not the degree of instability of the vehicle has become equal to or greater than the second value. In this determination, it is determined, for example, whether or not the slipping state or drifting state has switched to a spinning state or the like. In a case where the determination is affirmative, the flow switches to step 604, and in a case where the determination is negative, the flow switches to step 614.

At step 604, it is determined whether or not seatbelt adjustment is in progress. In this determination, it is determined whether or not the degree of instability of the vehicle has already become equal to or greater than the second value and the seatbelt actuator 28 is operating. In a case where the determination is negative, the flow switches to step 606, and in a case where the determination is affirmative, the flow switches to step 608.

At step 606, seatbelt adjustment is started due to operation of the seatbelt actuator 28 being started, and the flow returns to step 600. That is to say, tension is applied to the seatbelt 32.

Further, at step 608, it is determined whether or not a predetermined belt stop time (a time from starting of belt adjustment until a desired tension is reached) has been reached. In a case where the determination is negative, the flow switches to step 610, and in a case where the determination is affirmative, the flow switches to step 612.

At step 610, it is determined whether or not the collision has occurred. In this determination, it is determined whether or not the collision has occurred from values of the vehicle speed sensor 36 and acceleration sensor 38 or the like, or it is determined whether or not the collision has been detected by an unillustrated bumper sensor. In a case where the determination is affirmative, the flow switches to step 612, and in a case where the determination is negative, the flow returns to step 600, and the above-described processing is repeated.

At step 612, operation of the seatbelt actuator 28 is stopped, belt adjustment is stopped, and the series of processing is finished.

On the other hand, when the determination of step 602 is negative and the flow switches to step 614, it is determined whether or not belt adjustment is in progress. That is to say, it is determined whether or not the seatbelt actuator 28 is already operating. In a case where the determination is affirmative, the flow switches to step 616, and in a case where the determination is negative, the flow returns to step 600, and the above-described processing is repeated.

At step 616, since seatbelt adjustment is being carried out due to operation of the seatbelt actuator 28, resetting is carried out to stop operation of the seatbelt actuator 28, the flow returns to step 600, and the above-described processing is repeated.

That is to say, in the vehicle occupant protection device 11 according to the second exemplary embodiment of the present invention, adjustment of the seat is started at the point when the degree of instability of the vehicle has become equal to or greater than the first value, and adjustment of the seatbelt is started at the point when the degree of instability of the vehicle has become equal to or greater than the second value. Further, adjustment of the seat is stopped at the point when the degree of instability of the vehicle has become the second value or at the point when time t3 when the seatbelt actuator 28 operates so that the predetermined tension starts to be applied to the seatbelt 32 has been reached. As a result, a situation in which adjustment of the seat and adjustment of the seatbelt continue to be simultaneously carried out until a break down occurs is avoided, and in the same manner as in the first exemplary embodiment, a situation in which the load of the seat actuator 26 for carrying out adjustment of the seat increases to cause a break down, or in which an excessive load is applied to the vehicle occupant, can be prevented.

Further, in the present exemplary embodiment as well, in a case where it has been detected that the vehicle is in an unstable state, since seat adjustment is carried out at a speed that is faster than that of seat adjustment due to operation by the vehicle occupant, a situation, as shown in FIG. 7(C), in which seatbelt adjustment is started without seat adjustment being completed and both adjustments continue to be simultaneously carried out until a break down occurs, or in which an excessive load is applied to the vehicle occupant, can be prevented.

Incidentally, it should be noted that, depending on the adjustment amount of the seat, since adjustment to the appropriate state finishes immediately, even if a configuration is provided in which the seat adjustment stopping determination processing (step 512) is omitted with adjustment of the seatbelt just being carried out after the starting of seat adjustment, it is possible to prevent a situation in which adjustment of the seat and adjustment of the seatbelt continue to be simultaneously carried out and a break down occurs, or in which an excessive load is applied to the vehicle occupant, in the same manner as in the above-described exemplary embodiment.

Moreover, in the present exemplary embodiment as well, since adjustment of the seatbelt is carried out after adjusting the seat to the appropriate state, the tension of the seatbelt can be applied to the vehicle occupant at an appropriate riding posture, and therefore, vehicle occupant protection by the seatbelt can be carried out appropriately.

Incidentally, it should be noted that, in the respective exemplary embodiments described above, although a configuration has been explained in which the processing of the respective flowcharts is carried out at a plurality of ECUs, the invention is not limited thereto, and a configuration may be provided in which the processing of the respective flowcharts is carried out at a single ECU.

Further, in the respective exemplary embodiments described above, although a case has been explained in which the front side seat 34 and seatbelt 32 are adjusted as shown in FIG. 1, the invention is not limited thereto and may be applied to a case where seats and seatbelts at respective positions are adjusted.

Further, in the above-described first exemplary embodiment, although a configuration has been provided in which a collision is predicted using detection results of the forward millimeter wave radar 12, the forward lateral millimeter wave radar 14 and the stereo camera 16 and the like, the invention is not limited thereto, and known techniques of collision prediction can be applied. For example, a configuration may be provided in which a technique of predicting a collision using detection results of a laser radar, an infrared camera or the like is applied.

Further, in the above-described second exemplary embodiment, although a configuration has been provided in which the degree of instability of the vehicle is attained using the VSC system, the invention is not limited thereto, and for example, a configuration may be provided in which the degree of instability of the vehicle is attained from an operational state of the ABS.

The invention claimed is:

1. A vehicle occupant protection device comprising:
   a seat adjustment section that adjusts a state of a seat to an appropriate state;
   a belt adjustment section that adjusts a tension of a seatbelt;
   a judgment section that judges whether or not there is a need to adjust the state of the seat and the tension of the seatbelt; and
   a control section that controls the seat adjustment section and the belt adjustment section so as to start adjustment by the belt adjustment section after adjustment by the seat adjustment section is stopped, or so as to start adjustment by the belt adjustment section after adjustment by the seat adjustment section is started and stop adjustment by the seat adjustment section at a point when a time when a predetermined tension starts to be applied to the seatbelt due to adjustment by the belt adjustment section has been reached, in a case where it has been judged by the judgment section that there is a need to adjust the state of the seat and the tension of the seatbelt.

2. The vehicle occupant protection device according to claim 1, wherein:
   the judgment section judges that there is a need to adjust the state of the seat and the tension of the seatbelt, in a case where a collision has been predicted by a prediction section that predicts a collision; and
   the control section starts adjustment by the seat adjustment section at a point when a time until the collision prediction has become a first time and starts adjustment by the belt adjustment section at a point when the time until the collision prediction has become a second time that is shorter than the first time, in a case where it has been judged by the judgment section that there is a need to adjust the state of the seat and the tension of the seatbelt.

3. The vehicle occupant protection device according to claim 2, wherein the control section stops adjustment by the seat adjustment section in a case where the state of the seat has become the predetermined appropriate state before control is carried out so as to stop adjustment by the seat adjustment section.

4. The vehicle occupant protection device according to claim 2, wherein the control section stops adjustment by the seat adjustment section after passage of a predetermined time period after adjustment by the seat adjustment section is started.

5. The vehicle occupant protection device according to claim 2, wherein the seat adjustment section adjusts the seat to the appropriate state at a speed that is faster than a speed at the time of adjusting the state of the seat due to an operation by the vehicle occupant.

6. The vehicle occupant protection device according to claim 1, wherein the control section stops adjustment by the seat adjustment section in a case where the state of the seat has become the predetermined appropriate state before control is carried out so as to stop adjustment by the seat adjustment section.

7. The vehicle occupant protection device according to claim 1, wherein the control section stops adjustment by the seat adjustment section after passage of a predetermined time period after adjustment by the seat adjustment section is started.

8. The vehicle occupant protection device according to claim 1, wherein the seat adjustment section adjusts the seat to the appropriate state at a speed that is faster than a speed at the time of adjusting the state of the seat due to an operation by the vehicle occupant.

9. The vehicle occupant protection device according to claim 1, wherein:
   the judgment section judges that there is need to adjust the state of the seat and the tension of the seatbelt, in a case where a predetermined degree of instability has been detected by a detection section that detects a degree of instability of a vehicle expressing a degree of disturbance of a vehicle posture that is judged from a traveling state; and
   the control section starts adjustment by the seat adjustment section in a case where the degree of instability of the vehicle that has been detected by the detection section has become a first value, and starts adjustment by the belt adjustment section in a case where the degree of instability of the vehicle that has been detected by the detection section has become a second value that is larger than the first value.

10. The vehicle occupant protection device according to claim 9, wherein the control section stops adjustment by the seat adjustment section in a case where the state of the seat has become the predetermined appropriate state before control is carried out so as to stop adjustment by the seat adjustment section.

11. The vehicle occupant protection device according to claim 9, wherein the control section stops adjustment by the seat adjustment section after passage of a predetermined time period after adjustment by the seat adjustment section is started.

12. The vehicle occupant protection device according to claim 9, wherein the seat adjustment section adjusts the seat to the appropriate state at a speed that is faster than a speed at the time of adjusting the state of the seat due to an operation by the vehicle occupant.

* * * * *